United States Patent
Ohnishi et al.

[11] Patent Number: 4,777,492
[45] Date of Patent: Oct. 11, 1988

[54] THERMAL RECORDING METHOD

[75] Inventors: Toshikazu Ohnishi, Tokyo; Tsutomu Toyono, Yokohama; Katsumi Kurematsu, Kawasaki; Shuzo Kaneko, Tokyo, all of Japan

[73] Assignee: Canon Kabushiki Kaisha, Tokyo, Japan

[21] Appl. No.: 925,295

[22] Filed: Oct. 31, 1986

[30] Foreign Application Priority Data

Nov. 7, 1985 [JP] Japan ................... 60-249170

[51] Int. Cl.$^4$ .................. G01D 9/00; G01D 15/14
[52] U.S. Cl. ...................... 346/1.1; 346/135.1; 430/19; 430/945
[58] Field of Search ............. 346/1.1, 76 PH, 76 L, 346/135.1; 430/19

[56] References Cited

U.S. PATENT DOCUMENTS

| | | | |
|---|---|---|---|
| 4,223,062 | 9/1980 | Hession | 346/135.1 X |
| 4,478,782 | 10/1984 | Kuder et al. | 346/135.1 X |
| 4,527,173 | 7/1985 | Gupta et al. | 346/135.1 |
| 4,598,395 | 7/1986 | Smith | 346/76 L X |
| 4,599,718 | 7/1986 | Nakagawa et al. | 340/76 L X |
| 4,636,804 | 1/1987 | Kuder et al. | 346/135.1 X |
| 4,656,079 | 4/1987 | Yamada et al. | 346/135.1 X |

Primary Examiner—A. D. Pellinen
Assistant Examiner—Derek S. Jennings
Attorney, Agent, or Firm—Fitzpatrick, Cella, Harper & Scinto

[57] ABSTRACT

A recording method utilizing a thin blended layer of two or more polymers which assumes a mutually dissolved transparent state below a predetermined temperature but a phase-separated opaque state above this temperature, in which a halftone reproduction is achieved through control of temperature applied to the thin layer.

12 Claims, 1 Drawing Sheet

THERMAL RECORDING METHOD

BACKGROUND OF THE INVENTION

1. Field of the Invention

The present invention relates to a thermal recording method employing a recording member which can be adapted for use in a display or recording device. The recording member is capable of reversible information recording and erasure by heating and cooling and allows optical information reading.

2. Related Background Art

There has long been known recording of information, such as image, with a material which undergoes a state change within a short period when brought above a certain temperature by thermal energy.

In such conventional recording methods, there are known reversibly erasable and repeatedly usable recording materials such as photochromic materials, thermochromic materials or magnetic recording materials. Thermochromy is found in various organic and inorganic substances, but fixing the recorded information is difficult in the case of photochromy. Recently there have been proposed, as new thermal recording methods, a chalcogenide glass system utilizing crystalline-amorphous phase change and a system of a low-molecular fatty acid, an amide ester thereof or an ammonium salt thereof dissolved in a thermoplastic polymer and utilizing a thermal change in material (Japanese patent application Laid-open No. 117140/1982). However the system of chalcogenide glass is expensive because th recording layer is prepared by evaporation and is also associated with the problem of toxicity. Also a film in which a low-molecular material is dissolved in a thermoplastic polymer as disclosed in the Japanese patent application Laid-open No. 116380/1982 has not been used in practice since the recording and erasure have to be conducted in a delicate (i.e., precise) temperature range.

SUMMARY OF THE INVENTION

The object of the present invention is to provide a thermal recording method which is not associated with the drawbacks of the above-explained thermal recording materials of the conventional art and enables halftone reproduction.

The above-mentioned object can be achieved according to the present invention by a thermal recording method utilizing a recording material which changes from a transparent state to a white opaque state and retains opaque state when heated to a certain temperature and returns to the transparent state when gradually cooled, and an intermediate opaque state representing a halftone state is obtained by regulating the amount of heat applied to the heating element for recording. The amount of heat can be controlled by regulating the electric power supplied to the recording element or by regulating the intensity or duration of illuminating light.

DETAILED DESCRIPTION OF THE PREFERRED EMBODIMENT

Figure 1:
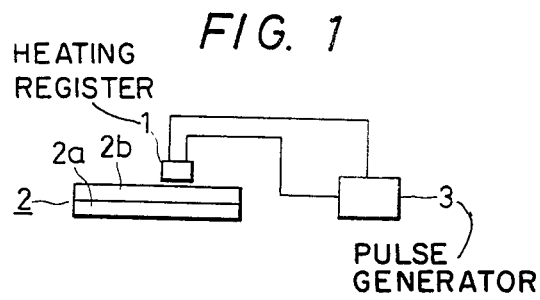
FIG. 1 is a schematic view showing the principle of heat control by a heating resistor.

FIG. 1 schematically shows the principle of the present invention. An image forming sheet 2 is composed of a substrate 2a of a plastic film, and a high-molecular recording material 2b formed thereon. A heating resistor 1 such as a thermal head applies heat to the image forming sheet 2, thus causing a change in the recording material 2b thereof and forming a visible image therein. Heat generation by said heating element 1 is achieved by applying a pulse current, generated by a pulse generator 3, to said heating element 1. Even if the relative moving speed between the sheet 2 and the heating element 1 is constant, the amount of heat supplied to the recording material 2b can be regulated by varying the duration or magnitude of each pulse current.

The above-mentioned high-molecular recording material is composed of a thin blended layer of at least two stable polymers, which are in a mutually dissolved uniform state below a certain temperature but in a phase-separated state above said temperature. If said polymers have different refractive indexes, the polymer blend shows uniform transparency to light in the mutually dissolved state but becomes opaque in the phase-separated state at the higher temperature. Such polymer blend, showing an LCST (Lower Critical Solution Temperature) phase diagram, is already known for a certain number of polymer combinations. Examples of such combinations are a combination of a vinylidene fluoride-hexafluoroacetone copolymer and a methacrylate ester polymer; a combination of a vinylidene fluoride copolymer and an acrylate ester polymer; a combination of polyvinylidene fluoride and polymethyl acrylate, polyethyl acrylate, polymethyl methacrylate or polyethyl methacrylate; a combination of polycaprolactone and polycarbonate (R. E. Bernstein et al., Macromolecules 10, p.681 (1977)); a combination of polystyrene and polyvinylmethylether (M. Bamk et al., J. Polym. Sci., A-2.10, p.1097 (1972), a combination of a styrene-acrylonitrile copolymer and polycaprolactone (L. P. McMaster Macromolecules 6, p.760 (1973); a combination of a styrene-acrylonitrile copolymer and polymethyl methacrylate (L. P. McMaster, Polym. Prepr., 15, p.254 (1974); a combination of polyvinyl nitrate and polymethyl acrylate (Saburo Akiyama et al., Kobunshi Ronbunshu 33, p.238 (1976); a combination of polyvinylidene fluoride and polyvinyl-methylketone (D. R. Paul et al., Polym. Eng. Sci., 18, p.1225 (1978)); and a combination of an ethylene-vinyl acetate copolymer and chlorinated rubber (J. Leffing-well et al., Polym. Prepr., 14, p.596 (1973)). These polymer blends generally cause phase separation in a temperature range of 100°–200° C. depending on the blending ratio, thus becoming more opaque by light scattering, in comparison with an unheated area.

Such high-molecular recording material can be fixed in the phase-separated state if it is rapidly cooled from the heated phase-separated state, but will return to the state of mutual dissolution if it is heated above the temperature of phase separation and then gradually cooled therefrom. Consequently the recording with such high molecular recording material is conducted by applying a signal inducing a temperature above the phase separation temperature, followed by rapid cooling. The recorded image can be erased by heating of the entire area or a recorded area followed by gradual cooling.

As will be apparent from the foregoing description, the high molecular recording material employed in the present invention allows to significantly extend the number of cycles of recording and erasure since it relies on a combination of stable polymers and does not involve a material change as in the conventional thermochromic materials or in the system of a low molecular substance in a polymer matrix. Also it allows the single construction of a recording apparatus through the control (1) of heating to a temperature causing phase separation and (2) of cooling time, since it does not rely on a delicate temperature control.

In the following there will be given a more detailed explanation on the halftone reproduction while making reference to the foregoing drawing. As an example a polyethylene terephthalate film of 300 microns in thickness was employed as the substrate 2a of the image forming sheet 2, and the high molecular recording material 2b was composed of a blended polymer of a fluorinated resin and methyl methacrylate.

Figure 2:
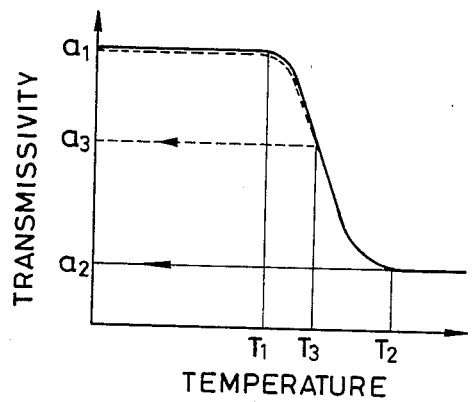
FIG. 2 is a chart showing the change in light transmission of the recording member as a function of temperature thereof.

FIG. 2 is a chart showing the light transmissivity of the recording material 2b as a function of heating temperature of the image forming sheet 2 by the heating element 1. The image forming sheet, which is transparent (transmissivity a1), maintains said transmissivity up to a temperature T1 upon heating, but starts to lose the transparency and turns opaque beyond said temperature T1. At a temperature T2 (>T1) the transmissivity reaches a value a2 (<a1) but no longer changes even at a higher temperature. On the other hand, if the sheet 2 of the transmissivity a1 is once heated to a temperature above T1 and then left in the air without heating, the transmissivity of the sheet remains at a value corresponding to the highest heating temperature even after the temperature of sheet becomes lower.

Consequently, if the transparent image forming sheet 2 can be heated to an arbitrary temperature between T1 and T2, there can be obtained a transmissivity a3 corresponding to said temperature and such image forming sheet can therefore be used for recording or display involving halftone.

Figure 3:
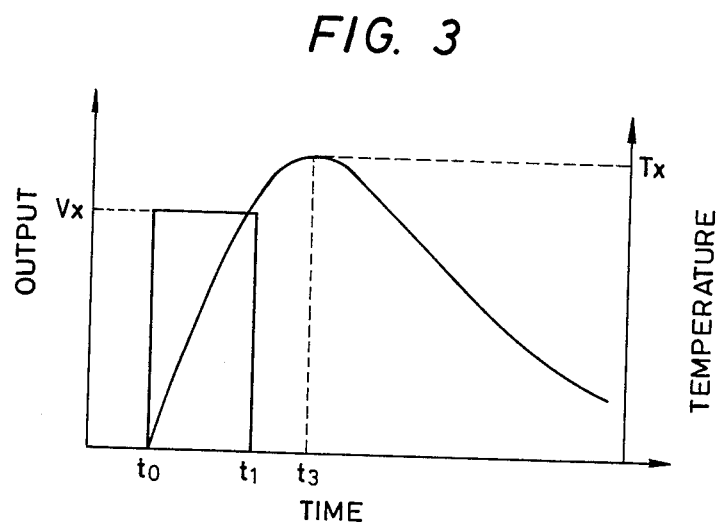
FIG. 3 is a chart showing the relationship between the pulse output wave form and the temperature of an image forming sheet.

FIG. 3 shows the relationship between a pulse output supplied to said heating resistor 1 and the temperature change in time of the image forming sheet. Table 1 summarizes the products of pulse output Jx and pulse width tx (=t1−t0), the temperatures Tx reached by the image forming sheet of the initial transmissivity a1, and the transmissivities ax of the sheet after receiving the pulse input. The image formed on the sheet 2 can be erased to the initial transparent state of transmissivity a1, by heating the sheet to a temperature as shown in FIG. 2 and then gradually cooling the sheet through appropriate temperature control for example, using a heater.

TABLE 1

| Pulse output Jx (W) | Pulse width tx (sec) | Jx × tx W. sec | Temp. reached Tx (°C.) | Transmissivity ax (%) |
|---|---|---|---|---|
| 30 | 1 | 30 | 50 | 90 |
| 30 | 2 | 60 | 59 | 62 |
| 60 | 1.5 | 90 | 68 | 54 |
| 60 | 2 | 120 | 75 | 41 |
| 60 | 2.5 | 150 | 90 | 22 |

Figure 4:
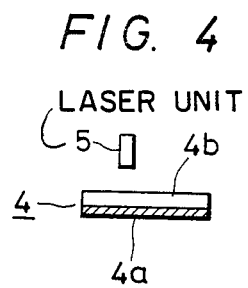
FIGS. 4 and 5 are schematic views showing the principle of temperature control with a laser beam.
Figure 5:
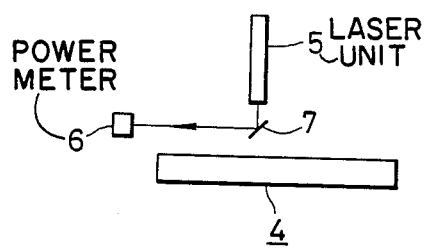

FIGS. 4 and 5 illustrate another embodiment. In FIG. 4, an image forming sheet 4 is composed of a substrate 4a containing a dye which generates heat upon absorbing a laser beam, and the aforementioned high molecular recording material 4b provided thereon. A laser unit 5 for emitting a modulated laser beam is capable of controlling the amount of heat given to the recording material 4b by regulating the laser power or the laser beam diameter.

FIG. 5 schematically shows an arrangement for measuring the change in the recorded image on the sheet 4 when the intensity of the laser beam is modified. The intensity of a pulse oscillated $CO_2$ laser 5 (half peak width 100 ns) is measured by a monitoring power meter 6. A half mirror 7 leads a part of the laser beam to said power meter and the remainder to the sheet 4.

Table 2 summarizes the result of measurement of change in transmissivity of the sheet 4 at various outputs of the laser pulse.

TABLE 2

| $CO_2$ laser pulse output (KW) | Pules half peak width (ns) | Temp. reached Tx (°C.) | Transmissivity ax (%) |
|---|---|---|---|
| 10 | 100 | 45 | 92 |
| 100 | 100 | 65 | 53 |
| 200 | 100 | 72 | 39 |
| 1000 | 100 | 88 | 20 |

As will be apparent from this table, it is also possible to regulate the transmissivity of the image forming sheet 4 and to reproduce a halftone by controlling the intensity of a laser beam. Such laser beam intensity control can be achieved not only by the aforementioned pulse output control but also other already known methods.

As explained in the foregoing, it is thus rendered possible to satisfactorily vary the transmissivity of the aforementioned high molecular recording member and to obtain halftone reproduction through a change in the amount of heat supplied per unit time to the image forming sheet.

What is claimed is:

1. A thermal recording method, comprising the steps of:
   selecting a recording material providing a recording layer of a blend of at least two stable polymers which are in a mutually dissolved unifrom state below a certain temperatue and at least partially in a phase-separated state above said temperature, thereby changing from a transparent state to an opaque state heated above said temperature, wherein said layer (i) stays opaque if it is rapidly cooled below said tempreatue and (ii) returns to said transparent state when it is gradually cooled below said temperature, and wherein an intermediate opaque state may be obtained by varying the amount of said blend which is in a phase-separated state;
   heating at least a portion of said blend layer to make said portion in said at least partially phase-separated state; and
   slowly cooling at least a portion of said heated portion to restore at least a portion of said slowly cooled portion to a less phase-separated state.

2. A thermal recording method according to claim 1, wherein the heating of said polymer blend layer is conducted with an electrical heating resistor, and the control of the amount of heating is achieved by controlling the amount of electric power supplied to said heating resistor.

3. A thermal recording method according to claim 1, wherein the heating of said polymer blend layer is conducted with a light involving thermal energy, and the control of the amount of heating is achieved by controlling the amount of said light.

4. A thermal recording method according to claim 3, wherein said control is achieved by controlling the light intensity per unit time.

5. A thermal recording method according to claim 3, wherein said control is achieved by controlling the irradiating time of said light.

6. A thermal recording method according to claim 1, wherein said polymer blend layer is composed of a thin polymer blend layer of at least two stable polymers which are in a mutually dissolved uniform state below a predetermined temperature and are in a phase-separated state above said temperature.

7. A thermal recording method according to claim 6, wherein said polymer blend layer is selected from a combination of a vinylidene fluoride-hexafluoroacetone copolymer and methacrylate ester polymer; a combination of a vinylidene fluoride copolymer and a acrylate ester polymer; a combination of polyvinylidene fluoride and polymethyl acrylate, polyethyl acrylate, polymethyl methacrylate or polyethyl methacrylate; a combination of polycaprolactone and polycarbonate; a combination of polystyrene and polyvinylmethylether; a combination of a styrene-acrylonitrile copolymer and polycaprolactone; a combination of a styrene-acrylonitrile copolymer and polymethyl methacrylate; a combination of polyvinyl nitrate and polymethyl acrylate; a combination of polyvinylidene fluoride and polyvinylmethylketone; and a combination of an ethylene-vinyl acetate copolymer and chlorinated rubber.

8. A thermal recording method according to claim 7, wherein said substrate is composed of polyethylene terephthalate resin.

9. A thermal recording process according to claim 1, wherein said polymer blend layer is provided on a substrate.

10. A thermal recording method according to claim 9, wherein said polymer blend layer is composed of a polymer blend selected from a combination of a vinylidene fluoride-hexafluoroacetone copolymer and a methacrylate ester polymer; a combination of a vinylidene fluoride copolymer and an acrylate ester polymer; a combination of polyvinylidene fluoride and polymethyl acrylate, polyethyl acrylate, polymethyl methacrylate or polyethyl methacrylate; a combination of polycaprolactone and polycarbonate; a combination of polystyrene and polyvinylmethylether; a combination of a styrene-acrylonitrile copolymer and polycaprolactone; a combination of a styrene-acrylonitrile copolymer and polymethyl methacrylate; a combination of polyvinyl nitrate and polymethyl acrylate; a combination of polyvinylidene fluoride and polyvinylmethylketone; and a combination of an ethylene-vinyl acetate copolymer and chlorinated rubber.

11. A thermal recording method according to claim 10, wherein the heating of said polymer blend layer is conducted with an electric heating resistor, and the control of the amount of heating is achieved by controlling the amount of electric power supplied to said heating resistor.

12. A thermal recording method according to claim 10, wherein the heating of said polymer blend layer is conducted with a light involving thermal energy, and the control of the amount of heating is achieved by controlling the amount of said light.

* * * * *

UNITED STATES PATENT AND TRADEMARK OFFICE
CERTIFICATE OF CORRECTION

PATENT NO. : 4,777,492
DATED : October 11, 1988
INVENTOR(S) : TOSHIKAZU OHNISHI, ET AL.

It is certified that error appears in the above-identified patent and that said Letters Patent is hereby corrected as shown below:

AT [56] IN REFERENCES CITED

U.S. Patent Documents, "Nakagawa et al.    ..... 340/76 L X"
   should read --Nakagawa et al.    ..... 346/76 L X--.

COLUMN 4

Line 46, "unifrom" should read --uniform--.
   Line 47, "temperatue" should read --temperature--.
   Line 50, "state heated" should read --state when heated--.
   Line 52, "temperatue" should read --temperature--.

COLUMN 5

Line 24, "a" (second occurrence) should read --an--.

COLUMN 6

Line 4, "process" should read --method--.

Signed and Sealed this

Twenty-eighth Day of March, 1989

Attest:

DONALD J. QUIGG

Attesting Officer         Commissioner of Patents and Trademarks